(12) United States Patent
Monzo et al.

(10) Patent No.: US 7,348,889 B2
(45) Date of Patent: Mar. 25, 2008

(54) BABY CAR SEAT ALARM SYSTEM

(76) Inventors: Joseph J Monzo, 545 Coco Palms Ave., Las Vegas, NV (US) 89123; William L Timm, 2714 Sadie La., Henderson, NV (US) 89074; Debra A Sommese, 223 Molly Ct., Las Vegas, NV (US) 89123

( * ) Notice: Subject to any disclaimer, the term of this patent is extended or adjusted under 35 U.S.C. 154(b) by 181 days.

(21) Appl. No.: 11/224,512

(22) Filed: Sep. 12, 2005

(65) Prior Publication Data

US 2007/0057799 A1    Mar. 15, 2007

(51) Int. Cl.
B60K 28/00    (2006.01)
G08B 21/00    (2006.01)

(52) U.S. Cl. .................. 340/573.1; 340/667; 180/273
(58) Field of Classification Search ............... 340/667, 340/666, 457; 180/273
See application file for complete search history.

(56) References Cited

U.S. PATENT DOCUMENTS

| | | | |
|---|---|---|---|
| 6,104,293 A * | 8/2000 | Rossi ...................... 340/573.1 |
| 6,441,731 B1 * | 8/2002 | Hess ...................... 340/539.26 |
| 6,535,137 B1 * | 3/2003 | Ryan ........................... 340/687 |
| 2003/0122662 A1 * | 7/2003 | Quinonez ................... 340/457 |
| 2003/0132838 A1 * | 7/2003 | Toles .......................... 340/457 |
| 2003/0222775 A1 * | 12/2003 | Rackham et al. ........... 340/457 |
| 2006/0197650 A1 * | 9/2006 | Jones et al. ................. 340/5.61 |
| 2006/0273917 A1 * | 12/2006 | Rams, Jr. ..................... 340/667 |
| 2007/0057775 A1 * | 3/2007 | O'Reilly et al. ............ 340/309 |

* cited by examiner

Primary Examiner—Benjamin C. Lee
Assistant Examiner—Jennifer Mehmood

(57) ABSTRACT

A system and method to warn that a child has been left unattended in the vehicle for a pre-set period of time after the ignition has been turned off. The system includes a sensing device to detect if a child is in the infant seat, an ignition detection device to detect that the ignition has been turned off, a timing microprocessor device to time the pre-set period of time and to generate an alarm and a page, a prerecorded voice message and speaker, a reset button to reset the timing of the pre-set period of time if desired by the caregiver, and an FM antenna with a manual page button.

18 Claims, 3 Drawing Sheets

BABY CAR SEAT ALARM SYSTEM

CROSS REFERENCE TO RELATED APPLICATIONS

| | | | |
|---|---|---|---|
| 5,793,291 | August, 1998 | Thornton | 340/573.1 |
| 5,949,340 | September, 1999 | Rossi | 340/573.1 |
| 6,104,293 | August, 2000 | Rossi | 340/573.1 |
| 6,535,137 | March, 2003 | Ryan | 340/687 |
| 6,714,132 | March, 2004 | Edwards, et. al. | 340/573.1 |
| 6,870,472 | March, 2005 | Gift, et. al. | 340/457 |
| 6,922,147 | July, 2005 | Viksnins, et. al. | 340/573.1 |
| 6,922,622 | July, 2005 | Dulin, et. al. | 701/45 |

FEDERALLY SPONSORED RESEARCH OR DEVELOPMENT

Not Applicable

SEQUENCE LISTING, TABLE, OR COMPUTER PROGRAM LISTING COMPACT DISC APPENDIX

Not Applicable

BACKGROUND OF THE INVENTION

There have been a number of tragic deaths in which children have mistakenly been left in automobiles after the driver reached a desired destination and left the vehicle. The deaths have usually been caused by a buildup of excess heat or cold within the vehicle during the absence of the driver. Infants, in particular, are susceptible to dehydration when subjected to the elevated temperatures within an enclosed vehicle, and can easily slip into a comatose state. Furthermore, no child should be left unattended in any vehicle for any length of time and for any reason.

According to the Aug. 31, 2005 edition of the Las Vegas Review Journal, there were 62 cases of children being left in cars in that city alone. Nationwide, 28 children have died so far in 2005 after being exposed to extreme heat in vehicles.

One system for preventing children from becoming inadvertently locked within a vehicle is described in U.S. Pat. No. 5,793,291. The system utilizes a motion detector to detect the presence of a child or pet within a located vehicle. However, the system fails to protect infants who have been left asleep in their child seats and are not capable of sufficient activity to set off a motion detector. Such infants may continue sleeping and may become dehydrated and comatose without ever waking, and therefore, they may not be detected by a motion detector.

Another system described in U.S. Pat. No. 6,104,293 provides for a warning system that warns when a child is in an infant seat and the vehicle's ignition has been turned off. However, it would be costly and overly complicated to install because it connects to many of the vehicle's components.

Reference is also given to U.S. Pat. No. 6,922,622 where the use of one or more systems senses the occupancy state and temperature inside the passenger or load space. However, this would not protect infants stranded in their car seats in vehicles during extremely cold temperatures because the system activates when it senses the temperature is above a pre-set minimum.

Lastly, U.S. Pat. No. 6,714,132 utilizes a system and method with a wireless tether comprising a detector, transmitter and receiver. An alarm is communicated to the caregiver when the caregiver ventures outside the range of transmission between the transmitter and receiver without having removed the child from the position as sensed by the detector. However, the system does not have an alarm, and the pager could be turned off or not be heard.

Therefore, the present inventors have recognized that there is an unmet need for an affordable, improved and simpler system to save children's lives.

It is an objective of the invention to provide a system that warns when a child has been left in an infant seat or a booster seat under dangerous conditions for longer than a specified period of time.

It is another objective of the invention to support up to two infant/booster seats and to be portable from one infant/booster car seat to another. Furthermore, an objective of the invention is to provide a means for a passenger in the car (other than an infant or small child) to manually page the driver.

SUMMARY OF THE INVENTION

In accordance with the present invention, a self-activating system is provided for warning when a child has been left in an infant seat or booster seat for a pre-determined amount of time after the vehicle has been turned off. The system includes two detectors, a relay switch, fuses, 2 microprocessors, a pager control, a reset switch, two pagers, one antenna, a recordable voice and siren module, and a speaker.

The system includes a detector for sensing the presence and/or absence of a child in a car seat. The detector is waterproof and is separated from the vehicle's electrical system through an optoisolator. An ignition detection mechanism determines the state of the vehicle's ignition system. When the presence of a child is detected in the car seat, and the ignition of the auto has been off for the factory pre-set time period of 96 seconds, the triggering system sends a signal to the microprocessor control. This unit outputs to the sound card and the paging system. It plays the recorded message through the speaker and serves as the alarm, which sounds like a baby crying. The caregiver maintains a pager and is paged. The pager has a range of over one-third of a mile. The pager will also emit an audible signal or a vibration if the caregiver goes out of range.

A reset switch will restart the 96 second delay if needed by the caregiver. Additionally, there is a manual paging device which allows a passenger (other than an infant or small child) to page the pager holder.

Once triggered, the alarm will reset if the car is started or the child is removed from the seat.

The sensor detecting the presence of a child in a car seat is completely portable to other car seats, having only two velcro attachment points. The system can accommodate up to two car seats simultaneously.

DETAILED DESCRIPTION OF THE INVENTION

Figure 1:
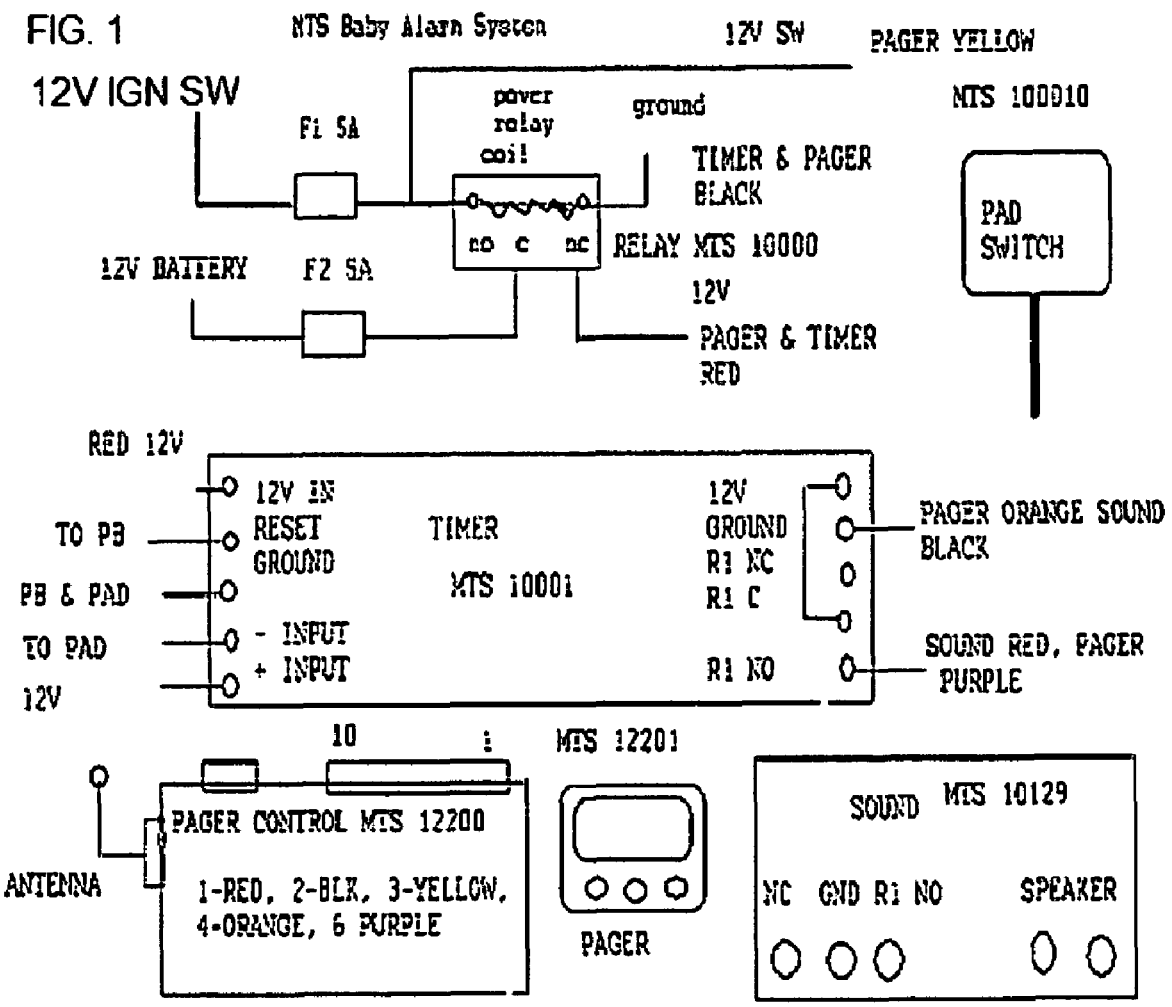
FIG. 1 is a schematic block diagram of a self-activating system for alerting a caregiver that a child has been left unattended in a vehicle in accordance with an embodiment of the present invention.
Figure 2A:
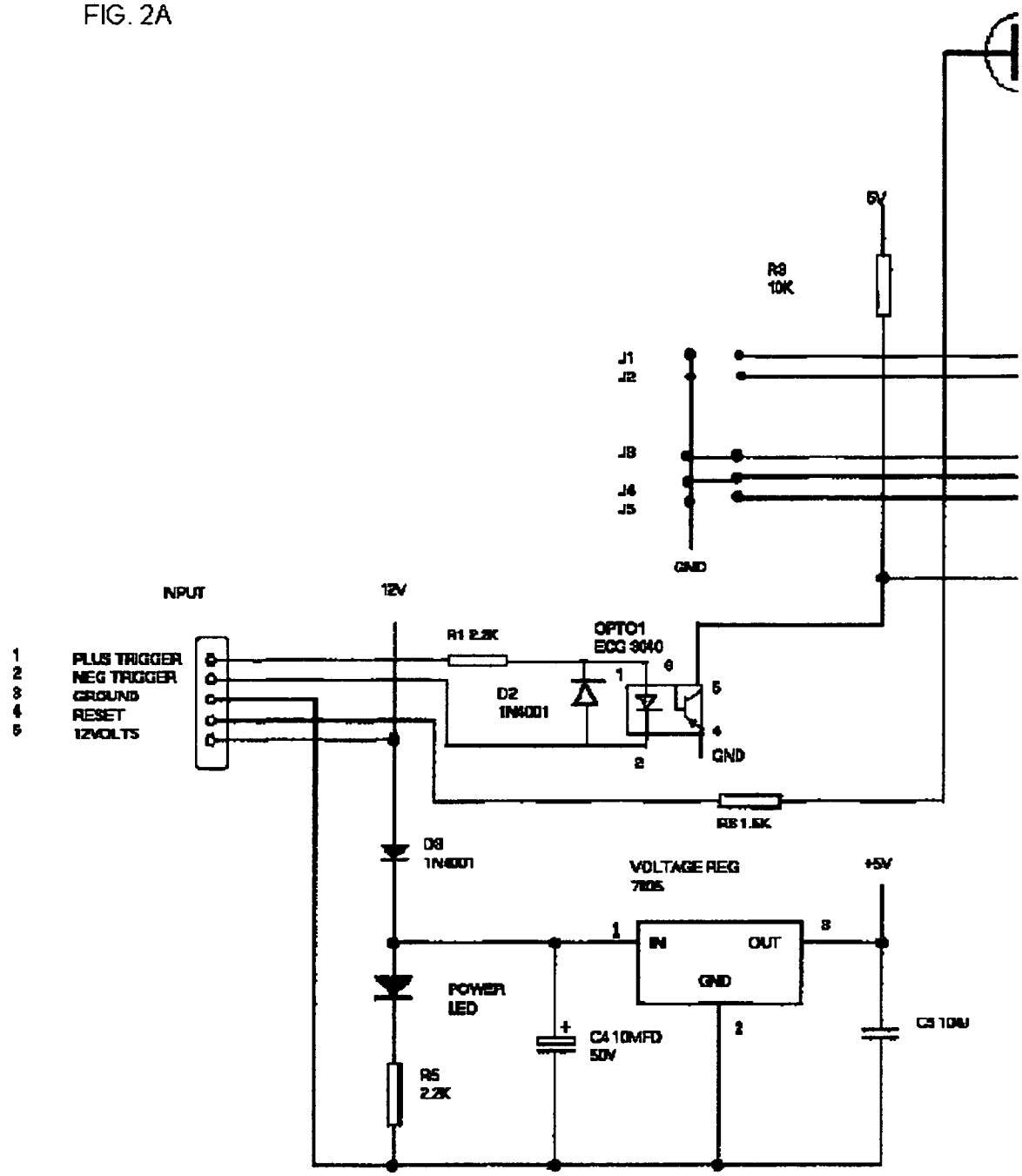
FIG. 2A and FIG. 2B is a schematic block diagram of the microprocessor timer control.
Figure 2B:
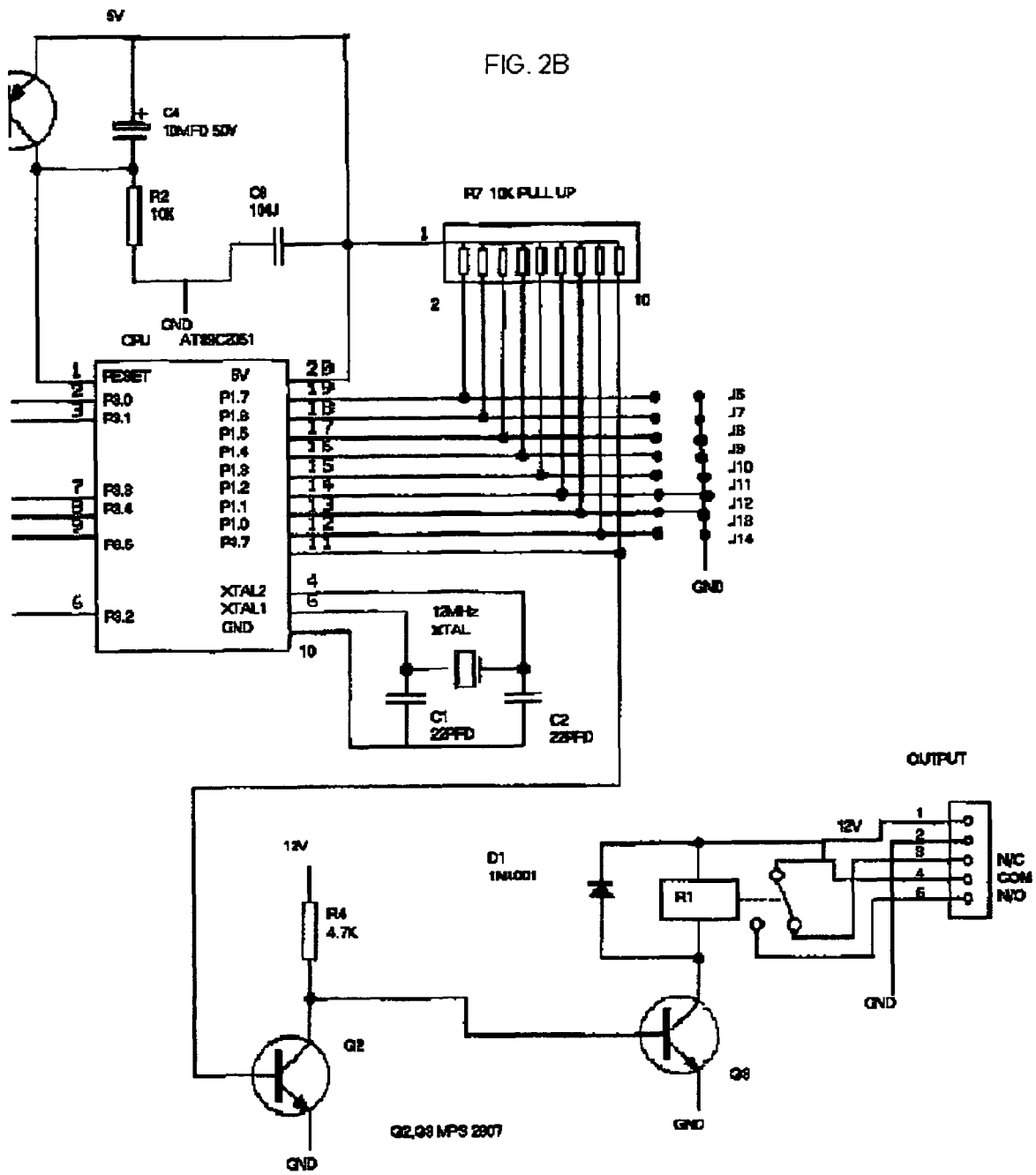

This system is intended for reducing the possibility of death or serious injury to a child when left unattended in a car seat for more than a specified period of time. The system is designed as a warning system to trigger only after a pre-set period of time from the weight of the child in a car seat and the car ignition is off.

Part # MTS 10000 Power Relay controls the power to enable or disable the system. This relay is connected to the car ignition switch.

Part # MTS 100010 Pad Switch is the triggering system that sends the signal to the microprocessor control. The normal installation is the pad is placed under the car seat cover and attached to the car seat frame. The contacts (normal open) switch ground to the timer control. This is a sealed water tight assembly.

Part # MTS 10001 Timing Processor Control. The delay is factory set for a 96 second delay from the time the car ignition is turned off with a child in the seat. This unit has a relay output to send 12 volts to the sound card and the paging system and plays the recorded message in loop mode until the car is started or the child is removed from the car seat. The reset push switch will reset the system timer, and this will restart the 96 second delay. Once triggered, the alarm will reset if the car is started or the child is removed from the car seat. The output from the Pad Switch is connected to an optoisolator on the timer to isolate the pad from the vehicle's electrical system.

Part # MTS10001 Pager Control and # MTS 12201 Pager. The system includes 2 pagers, one antenna, and 2 AAA 1.5v alkaline batteries. The unit has a range of over ⅓ mile. The pager can be set for vibration or audible mode. The FM transmitter antenna has a status LED to blink when the system is powered and a manual page button. The antenna unit is intended to be placed on the front windshield with the double sided tape with the LED towards the inside of the windshield. The pager will not reset if the alarm is triggered. The display is back lit and has a low battery reminder.

Part # MTS 10129 Recordable Voice and Siren Module and Speaker. The timer relay powers the module only when the alarm is triggered. This can play four different messages up to 2 minutes each or one eight minute message. The module has a microphone or can play WAV files with the PC interface. This unit has a recording of a baby crying and the unit has this recorded on message #1. The user can record his own message using the Recordable Voice Module. The specifications include 11 to 14 volts DC, volume control, 24 watt amplifier, max sound level 122 dB at one meter, max current at full volume 2.1 amps, 30 watt 8 ohm speaker, max speaker load 4 ohms. The normal speaker mounting area is under the hood of the car.

What is claimed is:

1. An after market system adapted to fit on any infant seat, said system for detecting the presence a child in an infant seat located within a vehicle comprising:
    means for detecting the presence and absence of a child in the infant seat;
    means for detecting an on and off state of the vehicle;
    means for automatically generating an alarm signal and wirelessly transmittable message signal in response to said means for detecting the presence and absence of a child in the infant seat detecting the presence of a child in the infant seat and said means for detecting the on and off state of the vehicle detects an off state;
    means for manually generating said wirelessly transmittable message signal;
    a timing process control means linked to said means for generating an audible alarm signal and message signal, said timing process control means having a pre-established threshold time after expiration of which said timing process control means automatically causes said means for generating an alarm signal and wirelessly transmittable message signal to generate an alarm signal and wireless message signal;
    a power source for supplying power; to said system;
    an alarm responsive to said alarm signal, said alarm in communication with a sound card and a speaker, said speaker positioned to alert passersby of said vehicle;
    one or more receivers for receiving said wirelessly transmittable message signal, said receivers having a pre-established range;
    a reset switch in communication with said timing process control means; and
    a recordable voice and siren module responsive to said timing process control means, said recordable voice and siren module operable to record a custom voice message.

2. The system of claim 1, wherein the means for detecting the presence and absence of a child in a car seat within a vehicle comprises a sensor located within the infant seat.

3. The system of claim 1, wherein the means for detecting an on and off state of the vehicle is a power relay operable to enable and disable the system.

4. The system of claim 1, wherein the means for generating the wirelessly transmittable message signal is operable to generate a page.

5. The system of claim 4, wherein the means for generating the wirelessly transmittable message signal comprises a pager controller and FM transmitter antenna.

6. The system of claim 1, further comprising one or more pagers operable to receive said wirelessly transmittable message signal.

7. The system of claim 1, wherein said timing process control means is programmed with a ninety-six second pre-established threshold time.

8. The system of claim 1, wherein said recordable voice and siren module is operable to record a voice message.

9. The system of claim 1, wherein said speaker is positioned under a hood of said vehicle.

10. An after market system adapted to fit on any infant seat, said system for detecting the presence of a child in an infant seat located within a vehicle comprising:
    at least one sensor for detecting the presence and absence of a child in the infant seat; p1 a relay for detecting an on and off state of the vehicle;
    a signal controller for automatically generating an alarm signal and wirelessly transmittable message signal in response to said sensor detecting the absence of a child in the infant seat and said means for detecting the on and off state of the vehicle detects an off state;
    a signal device operable to allow a user to manually generate a wirelessly transmittable message signal;
    a timing process controller linked to said signal controller, said timing process controller having a pre-established threshold time after expiration of which said timing process controller automatically causes said signal controller to generate an alarm signal and wirelessly transmittable message signal;
    a power source for supplying power to said system;
    an alarm responsive to said alarm signal, said alarm in communication with a sound card and one or more speakers, said one or more speakers positioned to notify passersby of said vehicle;

one or more receivers for receiving said wirelessly transmittable message signal, said receivers having a pre-established range;

a reset switch in communication with said timing process controller; and a recordable voice and siren module responsive to said timing process controller, said recordable voice and siren module operable to record a custom voice message.

11. The system of claim 10, wherein the relay is operable to enable and disable the system.

12. The system of claim 10, wherein the signal controller is operable to generate a page.

13. The system of claim 12, wherein the means for generating page comprises a pager controller and FM transmitter antenna.

14. The system of claim 12, further comprising one or more pagers operable to receive a page.

15. The system of claim 10, wherein said timing process controller is programmed with a ninety-six second pre-established threshold time.

16. The system of claim 10, wherein said recordable voice and siren module is operable to record a voice message.

17. The system of claim 10, wherein said speaker is positioned under a hood of said vehicle.

18. A method of alerting users of the presence of a child in an infant seat in a vehicle comprising:

allowing a user to record a custom verbal message to be used as an alarm;

sensing the presence a child in an infant seat;

sensing said vehicle in an off state;

after a pre-established time period of sensing the presence a child in an infant seat and sensing said vehicle in an off state, automatically generating an alarm signal and a wireless message signal;

responsive to said alarm signal, causing an audible alarm in the form of the verbal message to sound such that passersby of said vehicle are alerted;

configuring one or more hand-held devices to receive said wireless message signal; and providing means for a user to manually generate a wirelessly transmittable message signal.

* * * * *